United States Patent [19]
Daniels, Sr.

[11] 3,946,838
[45] Mar. 30, 1976

[54] FAIL-SAFE DISC BRAKE

[75] Inventor: William L. Daniels, Sr., Vandalia, Ohio

[73] Assignee: The B. F. Goodrich Company, Akron, Ohio

[22] Filed: May 22, 1975

[21] Appl. No.: 579,938

[52] U.S. Cl.................................. 188/170; 188/72.3
[51] Int. Cl.².................... F16D 55/08; B60T 13/04
[58] Field of Search .......... 188/72.3, 166, 167, 170, 188/171; 192/18 A, 91 R

[56] References Cited
UNITED STATES PATENTS

| | | | |
|---|---|---|---|
| 258,135 | 5/1882 | Schmucker | 188/67 UX |
| 2,584,191 | 2/1952 | Danly et al. | 188/170 |
| 3,831,718 | 8/1974 | Muller et al. | 188/170 |

Primary Examiner—Duane A. Reger

[57] ABSTRACT

A disc brake having a spring for mechanical actuation of the brake and a fluid pressure system for releasing and maintaining the brake in the released condition. Upon failure of the fluid pressure system, the brake is automatically actuated by the spring. Interposed between a friction member and a supporting body of the brake is a slant coil spring having an axis extending in a direction generally parallel to the disc surface. The coils are inclined at an angle with respect to the axis of the spring and the opposing edges of each of the coils are in engagement with the supporting body and the friction member to provide a substantially constant braking force over a range of braking positions with a spring requiring a minimum of space.

8 Claims, 3 Drawing Figures

U.S. Patent    March 30, 1976    3,946,838
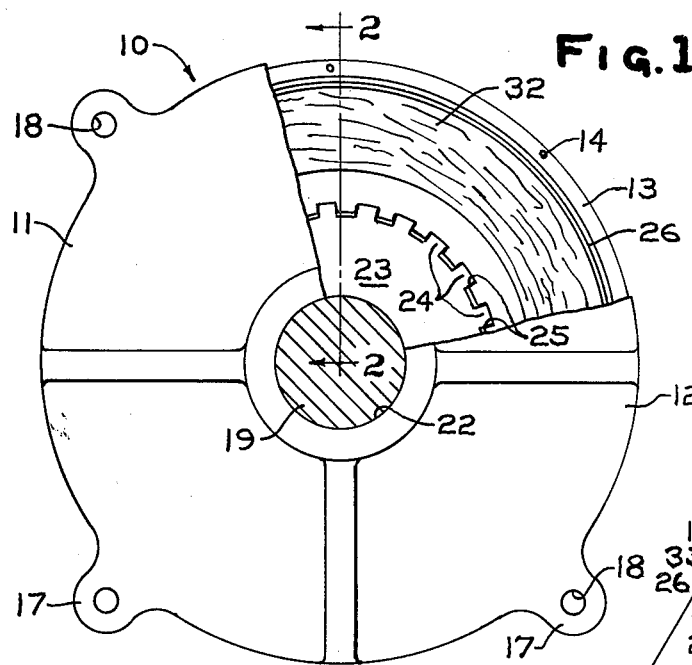
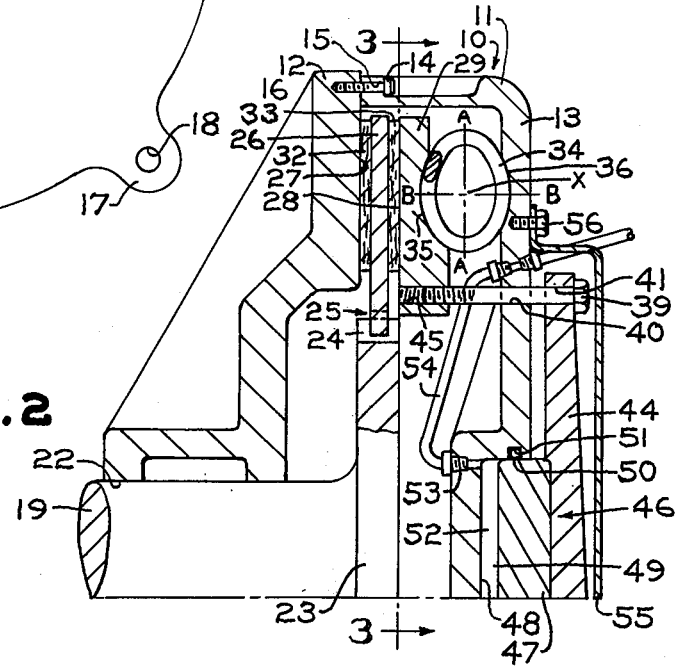
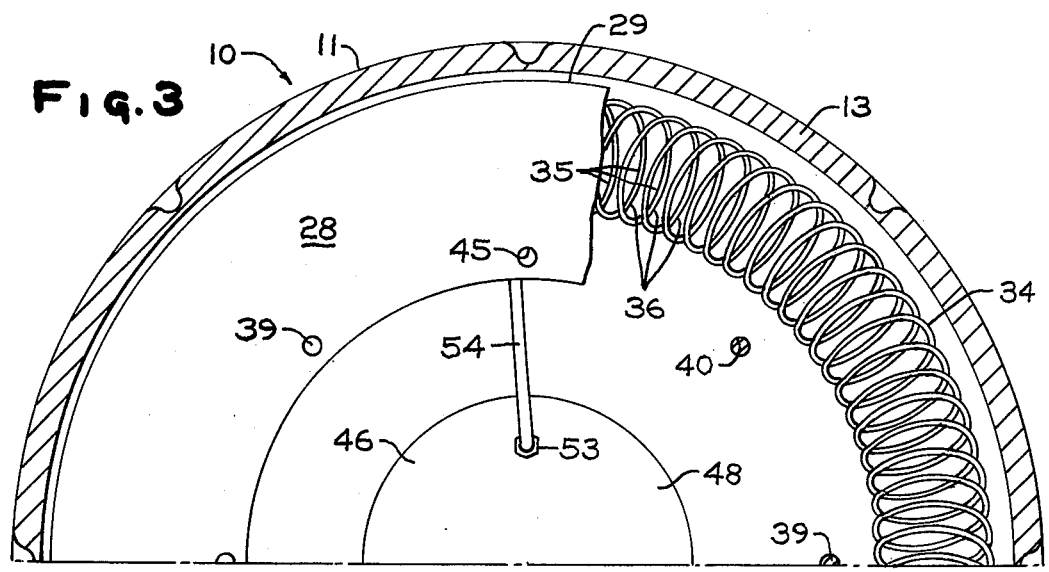

FAIL-SAFE DISC BRAKE

BACKGROUND OF THE INVENTION

This invention relates to disc type brakes and particularly to fail-safe disc brakes in which mechanical actuation of the brake friction elements is provided by a spring or other mechanical energy storing apparatus. Release of the brake is provided by hydraulic or air pressure for moving the brake friction elements out of braking engagement and holding them in the released or off position. In the event of air of hydraulic pressure failure, mechanical actuation of the brake will take place automatically.

Brakes of this type have utilized relatively long compression springs with relatively large diameters to produce the necessary braking forces. This has resulted in a brake requiring greater space than is desirable for brake installations.

The space required is substantially greater for brakes where high braking forces or high torque are desired because they require either an increased number of springs, a series of stacked rotor and stator elements or a large friction radius or brake diameter. This increased need for space has also increased the cost of the brake.

The high force compression springs used with these brakes have high spring rates and require frequent adjustments with small amounts of lining wear because of the limited travel of the springs. This limitation and the others set forth above have restricted the torque forces which can be economically handled by fail-safe disc brakes.

SUMMARY OF THE INVENTION

According to this invention a fail-safe disc brake is provided with a spring and brake design which produces high forces in a relatively small space. The brake is also capable of developing a predetermined minimum torque during the entire lining life without requiring adjustment of the brake. Mechanical actuation of the brake is provided by a slant coil spring interposed between the supporting body or housing and one or more friction members. The coils extend around a spring axis which is in a plane generally parallel to the surface of the rotating brake disc and the opposing edges of the coils are in engagement with a friction member and the brake housing. The spring may be annular and extend around a centrally located hydraulic piston and cylinder assembly interposed between the housing and a centrally located reaction plate connected by tie bolts to the friction member. The tie bolts may be used to release the brake after hydraulic failure. A floating disc and friction member in combination with the slant spring construction automatically compensate for the lining wear. With this design torque limitations are not imposed because the space requirements for springs acting on stacked rotor and stator elements with a large friction radius or brake diameter have been substantially reduced or eliminated.

The accompanying drawings show one preferred form of fail-safe disc brake made in accordance with and embodying this invention and is representative of how this invention may be practiced.

BRIEF DESCRIPTION OF THE DRAWINGS

FIG. 1 is an elevation of a disc brake assembly showing the end through which the drive shaft passes, with parts being broken away.

FIG. 2 is a cross sectional view taken along the plane of line 2—2 of FIG. 1.

FIG. 3 is a cross sectional view taken along the plane of line 3—3 of FIG. 2 with parts being broken away.

DETAILED DESCRIPTION

A fail-safe disc brake 10 is shown in FIGS. 1, 2 and 3 and is of a type used for a crane, hoist, vehicle drive shaft or other application in which the brake needs to be automatically applied if there is a control system failure. The brake 10 has a supporting body or housing 11 which may be made in two parts with a front housing member 12 fastened to a rear housing member 13 by screws 14 extending through holes 15 in the rear housing member and threaded into holes 16 in the front housing member.

The front housing member 12 has radially extending ears 17 with holes 18 spaced at suitable positions around the housing for receiving fasteners (not shown) to fixedly mount the housing 11 against turning.

A rotatable shaft 19 extends through annular bushings 20, 21 mounted in an opening 22 in the front housing member 12 and has a radially extending flange 23 mounted at the end thereof. The flange 23 has splines 24 extending axially of the shaft 19 for slidable engagement with grooves 25 of a floating disc 26 extending radially outward from the flange 23. The disc 26 is interposed between a friction surface 27 on the front housing member 12 and a friction surface 28 on an annular friction member such as floating shoe 29. Friction linings 32 and 33 of suitable friction material may be adhered to the disc 26 by a suitable adhesive for engagement with the friction surface 27 of the front housing member 12 and the friction surface 28 of floating shoe 29.

An annular slant coil spring 34 is interposed between the floating shoe 29 and the rear housing member 13 for resiliently moving the floating shoe 29 to the left as shown in FIG. 2. This movement urges the friction surface 28 of the shoe 29 into braking engagement with the friction lining 33 of the floating disc 26. It also urges the disc 26 to the left, as shown in FIG. 2, moving the lining 33 into frictional engagement with the friction surface 27 of the front housing member 12. The axis X of the spring 34 preferably lies in a plane A—A which is generally parallel to the surface of the floating disc 26. Opposite edges 35 and 36 of each of the coils of the slant coil spring 34 engage seats in the shoe 29 and rear housing member 13, respectively.

The floating shoe 29 is supported by circumferentially spaced-apart tie bolts 39 extending through holes 40 in the rear housing member 13 and holes 41 in a floating reaction plate 44. The tie bolts 39 are in threaded engagement with holes 45 in the floating shoe 29. The reaction plate 44 is movable to the right, as shown in FIG. 2, by fluid pressure means such as a centrally located piston and cylinder assembly 46. A piston 47 of the piston and cylinder assembly 46 is slidably mounted in a cylinder 48 in the rear housing member 13 providing a fluid chamber 49. A seal 50 is mounted in a groove 51 in the wall of the cylinder 48 for sealing engagement with the piston 47. The fluid chamber 49 may contain hydraulic fluid 52 under pressure to actuate the piston 47. The hydraulic fluid 52 may be communicated to the fluid chamber 49 through an inlet 53 in the cylinder 48 which is connected to a suitable source of hydraulic pressure fluid such as a hydraulic pump by a tube 54 extending from the inlet 53 through the rear housing member 13 and through a protective shield 55. The shield 55 when needed may extend over the reaction plate 44 and be fastened to the rear housing member 13 by screws 56.

As shown in FIGS. 2 and 3, the slant coil spring 34 is a round wire spring coiled in such a manner that its coils are all slanted at a predetermined angle resembling a conventional helically coiled spring that has been partially flattened at its sides. The slant coil spring 34 is then formed into a ring or annulus and the ends of the wire are welded. As shown in dot-dash lines in FIG. 2, energy is stored in the spring 34 by applying a load in a direction B—B normal to the plane A—A of the ring. As this load is applied, each coil continues to flatten until contact is made with the adjacent coil. By proper selection of parameters a nearly constant load can be obtained through part of the total deflection. Also, extremely high forces are obtainable in a very small space as compared to conventional compression springs. This is especially desirable for fail-safe disc brakes of this type where high torque values are desired without adjustment for wear of the linings 32 and 33.

In assembly of the brake 10, the slant coil spring 34 is compressed between the rear housing member 13 and floating shoe 29 by threading the screws 14 into the holes 16 in the front housing member 12. This initial compression provides the necessary force to urge the friction surface 28 of the shoe 29 into frictional engagement with the friction lining 33. The floating disc 26 is moved to the left, as shown in FIG. 2, and the friction lining 32 is urged against the friction surface 27 on the front housing member 12 providing the necessary braking engagement to stop the rotation of the shaft 19 relative to the housing 11.

Release of the brake is provided by introducing fluid pressure into the fluid chamber 49 of cylinder 48 causing the piston 47 to move to the right, as shown in FIG. 2, uring the reaction plate 44 to the right and pulling the floating shoe 29 away from the disc 26 through tie bolts 39 and thereby further compressing the slant coil spring 34.

In the event there is a control system failure and the hydraulic pressure is released, piston 47 will no longer hold the floating shoe 29 away from the disc 26 and the slant coil spring 34 will urge the shoe 29 to the left, as shown in FIG. 2, providing actuation of the brake.

Release of the brake after power failure may be obtained by removing the shield 55 and tightening the tie bolts 39 which will again compress the spring 34 and pull the floating shoe 29 to the right, as shown in FIG. 2, out of engagement with the friction lining 33 of the disc and permit release of the friction lining 32 from the friction surface 27 of the front housing member 12.

As the friction linings 32 and 33 wear, the coil spring 34 will be required to move the floating shoe 29 a greater distance to the left, as shown in FIG. 2, and with this type of spring a nearly constant pressure against the floating shoe can be obtained for braking as the disc 26 is moved from the braking position, shown in FIG. 2, to a braking position to the left due to the wear of the friction linings.

In the embodiment shown, the coil spring 34 extends 360° around the piston and cylinder assembly 46; however, a segmental construction in which the coil spring is in segments extending over angles of less than 360° may be desirable in certain applications. Hydraulic fluid pressure means have been used in the embodiment shown and described; however, other fluids may be used such as air. The present invention may also be applied to other types of brakes such as the floating caliper brake. It is understood that this invention may be utilized in a multiple rotor-stator brake where the discs may be of a floating type. The front housing 12 may be part of the structure of a vehicle on which the brake is mounted and the shaft 19 could extend through the housing 11 as well as the housing 12 with bearings or bushings in housing 12. In such a case, the piston 47 and cylinder 48 could be of an annular design or a series of piston-cylinder assemblies could be provided around the shaft 19. It is also contemplated that alternative apparatus such as links of keyways could be provided to allow for relative slidable engagement of the shaft 19 and disc 26.

We claim:

1. A fail-safe disc brake comprising a supporting body, a disc mounted for rotation relative to said supporting body, a friction member disposed between said supporting body and said disc, fluid pressure means connecting said supporting body and said friction member for moving said friction member in a direction away from said disc, spring means interposed between said supporting body and said friction member for moving said friction member of said disc, said spring means including a slant coil spring having coils extending around a spring axis in a plane generally parallel to said surface of said disc whereby opposite edges of each of said coils are urged apart for moving said friction member towards said disc.

2. A fail-safe disc brake in accordance with claim 1 wherein said slant coil spring is annular for exerting a braking force on said surface of said disc throughout the circumferential extent of said surface.

3. A fail-safe disc brake in accordance with claim 1 wherein said fluid pressure means further comprises a piston and cylinder assembly.

4. A fail-safe disc brake in accordance with claim 3 wherein said piston and cylinder assembly has a piston connected to said friction member by a reaction plate mounted on said piston and tie bolts extending between said reaction plate and said friction member.

5. A fail-safe disc brake in accordance with claim 2 wherein said fluid pressure means further comprises a centrally located piston and cylinder assembly with said slant coil spring extending generally around said assembly, said piston and cylinder assembly having a piston connected to a centrally located reaction plate and tie bolts connecting said reaction plate and said friction member for transmitting brake releasing forces to said friction member from said piston-cylinder assembly.

6. A fail-safe disc brake comprising a supporting body, a disc mounted for rotation relative to said supporting body having a first side and a second side for frictional braking engagement, a friction member located on said first side of said disc between said supporting body and said disc and having a surface movable into and out of braking engagement with said disc, and disc being mounted for axial movement relative to said supporting body, a supporting body friction surface located on said second side of said disc for engagement by said disc, fluid pressure means connecting said supporting body and said friction member for moving said friction member in a direction away from said disc, spring means interposed between said supporting body and said friction member for moving said surface of said friction member toward said disc into braking engagement with said first side of said disc and simultaneously moving said second side of said disc into braking engagement with said supporting body friction surface, said spring means including a slant coil spring having coils extending around a spring axis disposed in a plane generally parallel to the surface of said disc whereby opposite edges of each of said coils are in engagement with said supporting body and said friction member.

7. A fail-safe disc brake in accordance with claim 6 wherein said slant coil spring is annular and engages said supporting body and said friction member at circumferentially continuous positions.

8. A fail-safe disc brake in accordance with claim 7 wherein said fluid pressure means further comprises a centrally located piston and cylinder assembly with said spring extending around said assembly, said piston and cylinder assembly having a piston connected to a centrally located reaction plate, said reaction plate being movable relative to said supporting body and tie bolts extending between said reaction plate and said friction member for transmitting brake releasing forces from said reaction plate to said friction member to move said friction member away from said disc and permit said disc to move away from said supporting body friction surface.

* * * * *